United States Patent [19]
Harris

[11] Patent Number: 4,749,453
[45] Date of Patent: Jun. 7, 1988

[54] METHOD AND APPARATUS FOR MAKING HYDROCHLORIC ACID AND SODIUM HYDROXIDE

[75] Inventor: William G. Harris, Seattle, Wash.
[73] Assignee: The Boeing Company, Seattle, Wash.
[21] Appl. No.: 818,297
[22] Filed: Jan. 10, 1986
[51] Int. Cl.⁴ .............................................. C25B 1/14
[52] U.S. Cl. ...................................... 204/98; 204/103;
204/128; 204/129; 204/DIG. 4; 423/487;
429/13; 429/15; 429/199; 429/200
[58] Field of Search .................. 423/487; 204/98, 128,
204/DIG. 4, 103, 129; 429/13, 15, 199, 200

[56] References Cited
U.S. PATENT DOCUMENTS

| | | | |
|---|---|---|---|
| 4,246,078 | 1/1981 | Broniewski | 204/98 |
| 4,268,366 | 5/1981 | Broniewski | 204/98 |
| 4,299,673 | 11/1981 | Broniewski | 204/98 |
| 4,305,793 | 12/1981 | Broniewski | 204/98 |
| 4,380,575 | 4/1983 | Nakamura et al. | 429/13 |
| 4,502,928 | 3/1985 | Umetani et al. | 204/DIG. 4 |
| 4,534,833 | 8/1985 | Carr et al. | 204/DIG. 4 |

FOREIGN PATENT DOCUMENTS 2524058 12/1976 Fed. Rep. of Germany ... 204/DIG. 4

Primary Examiner—R. L. Andrews
Attorney, Agent, or Firm—John C. Hammar

[57] ABSTRACT

By combining the manufacture of sodium hydroxide and hydrochloric acid, and by using a fuel cell to optimize the energy consumption, the energy efficiency of the manufacture of NaOH and HCl can be improved by at least about 33%. Electrical energy produced in a hydrogen chloride fuel cell is used to assist the electrolysis reaction for making sodium hydroxide, thereby achieving a marked increase in the overall manufacturing efficiency.

14 Claims, 1 Drawing Sheet

METHOD AND APPARATUS FOR MAKING HYDROCHLORIC ACID AND SODIUM HYDROXIDE

TECHNICAL FIELD

The present invention relates to an apparatus and economical method for making hydrochloric acid and sodium hydroxide using a fuel cell. Chemical energy that is generated during the HCl reaction is converted into useful electrical energy that is consumed in making NaOH.

BACKGROUND ART

Conventional commercial methods for making hydrochloric acid (HCl in water) include, (1) the formation of acid during the chlorination of aromatic or aliphatic hydrocarbons, (2) the reaction of a chloride salt with sulfuric acid, (3) the combustion of hydrogen and chlorine according to the flame furnace method, or (4) the Hargreaves method. None of these methods captures the potential energy of the exothermic reaction between hydrogen and chlorine to optimize the energy efficiency of the manufacturing method.

Similarly, conventional methods for making sodium hydroxide consume energy while creating waste hydrogen and chlorine. By combining the manufacture of HCl and NaOH, and by using a fuel cell, significant savings can be readily achieved.

SUMMARY OF THE INVENTION

Significant energy savings are obtained with the present invention by coupling the manufacture of sodium hydroxide with HCl. Use of a fuel cell to make the HCl supplies electricity for the NaOH manufacturing process The resulting process consumes about 33% less electrical engery than conventional processes.

By making hydrochloric acid in a hydrogen-chlorine fuel cell, the chemical potential energy of the reactants, which is released during the reaction, can be captured as useful electrical energy to optimize the overall NaOH-HCl manufacturing process. About 810 kw-hr of electrical energy per 2000 lbs of hydrochloric acid formed in the fuel cell can be captured While conventional processes for producing hydrochloric acid consume energy and create significant waste heat, the process of the present invention creates useful energy. The flame furnace method, for example, consumes about 6 kw-hr per ton of HCl, while the fuel cell method of this invention generates 810 kw-hr of usable electrical energy that can be readily used in the electrolysis reaction customarily used to form NaOH.

Another novel feature of the present invention is the ability to control operation of the fuel cell so that the concentration of hydrochloric acid solution is in the range of 17–43 wt. % HCl. The fuel cell combines hydrogen and chlorine according to the reaction:

$$H_2 + Cl_2 + nH_2O \rightarrow 2HCl + nH_2O\ -40.02\ Kcal$$

wherein n=8 to 20 moles of water. Fuel cell energy output is relatively constant throughout this range of cooling water input, while the resulting HCl product varies in concentration between about 17 to 43 weight percent. Thus, the typical range of acid products can be made, as desired, without significant energy losses.

BEST MODE CONTEMPLATED FOR CARRYING OUT THE INVENTION

Hamilton Standard Electro-Chem hydrogen-chlorine fuel cells, arranged in a bank of cells, produce electricity and hydrochloric acid. In the fuel cell, gaseous hydrogen and chlorine are catalytically converted in a water matrix and solid electrolyte to hydrochloric acid with the conversion of about 70% of the chemical energy to electrical energy. Water is necessary for the reaction to occur, and, because it is supplied in excess, the water provides a convenient means for carrying waste heat from the fuel cells. The amount of water delivered to the cell can vary between 8 to 20 moles of water per mole of hydrogen without making a significant change in the electrical output of the fuel cell. By regulating the concentration of water entering the cell, the output concentration of hydrochloric acid solution formed in the cell can be regulated from about 17 to 43 weight percent. In producing about 2000 lbs of HCl, the fuel cells, produce about 810 kw-hr of electricity. A conventional flame furnace would consume 6 kw-hr of electricity. Operating at a voltage potential of 1.05 V per cell and 200 amperes per square foot, one hundred fuel cells having an area of 2 square feet would generate 42 KVA DC current with a voltage of 105 volts. This electrical energy could readily be converted into either 480 V three phase AC in an inverter or into 270 V DC in a DC motor/generator.

The hydrochloric acid can be made efficiently, according to the present invention, in combination with the manufacture of 76% caustic soda (sodium hydroxide). The conventional electrolytic process for producing NaOH uses about 2000 kw-hr per ton of NaOH, and produces about 1750 lbs of chlorine gas and 50 lbs of hydrogen gas as by-products. Instead of combining the hydrogen and chlorine formed in the NaOH process by the conventional flame furnace method, the hydrogen-chlorine fuel cells convert the hydrogen and chlorine into 1800 lbs of hydrochloric acid and capture 730 kw-hr of energy (accounting for losses). Even assuming an additional 10% loss in the associated inverter equipment, about 657 kw-hr of useful energy would result for recycling to the NaOH electrolysis reactor. The net electrical energy required for the overall process is accordingly reduced about 33% from that consumed in the conventional process.

Figure 1:
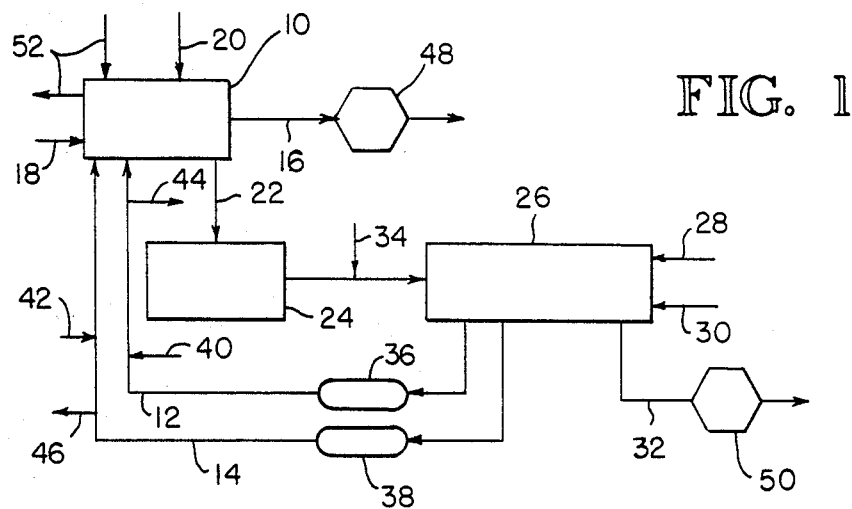
FIG. 1 is a schematic block diagram of a preferred system of the present invention.

Now, with more specific reference to the drawings, FIG. 1 illustrates a surprisingly efficient system for manufacturing NaOH and HCl in tandem.

In the fuel cells 10, hydrogen 12 and chlorine 14 are converted to HCl 16. Absorption of chlorine in water 18 is necessary to optimize the reaction. This catholyte water 18 absorbs the HCl and assists in cooling the cells. Additional water 52 is necessary to remove all the heat from the cells. D.C. power 22 is generated in the fuel cell 10 by the flow of hydrogen electrons in the chemical reaction process. In an inverter/generator 24, the power is converted to a form usable in the electrolysis reactor 26 where salt (NaCl) 28 and water 30 are converted into NaOH 32, hydrogen 12, and chlorine 14 by electrolysis. Supplemental electrical power 34 is combined with the power 22 generated by the fuel cells 10 to drive the reactor 26. At least about ⅓ of the power used in the electrolysis reactor 26 can be supplied to the reactor from the fuel cells 10, even accounting for losses that occur in the operating and conversion equipment.

The hydrogen 12 and chlorine 14 are withdrawn from the reactor 26, are scrubbed in respective scrubbers 36 and 38, and are fed to the fuel cells 10. Make-up hydrogen 40 and chlorine 42 are injected into the respective feed lines, if necessary. Hydrogen and chlorine purge streams 44 and 46 allow control of impurities within acceptable limits for the system.

An acid solution is collected in accumulator 48, and a basic solution of NaOH 32 in accumulator 50.

Cooling water 52 (FIG. 1) is withdrawn from the fuel cells 10 and is recycled after cooling in a conventional heat exchanger cooling system (not shown).

Figure 2:
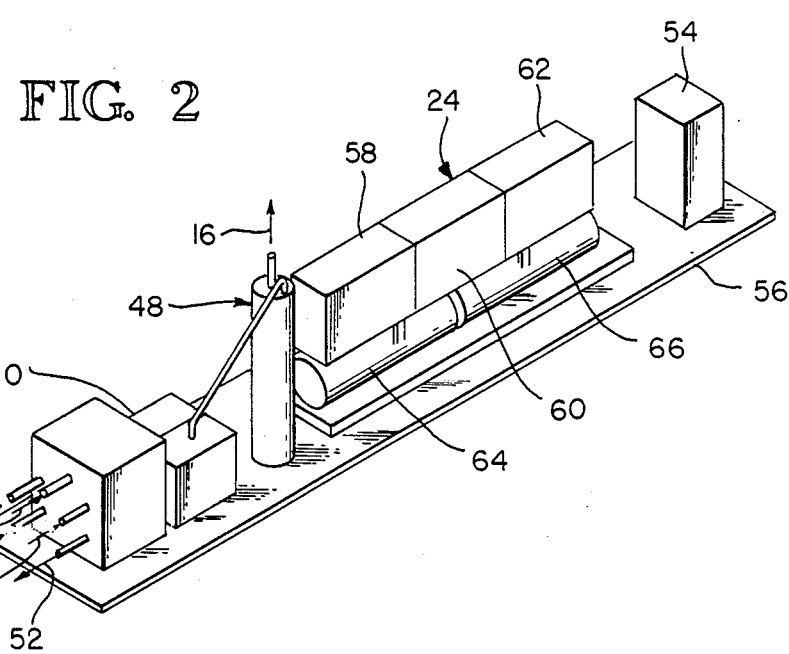
FIG. 2 is a schematic isometric of a preferred power module used for manufacturing HCl.

As shown in FIG. 2, the fuel cells 10, HCl accumulator 48, and inverter/generator 24, and HCl production controller 54 can be easily mounted on a single skid 56, that can be portable, if desired.

The inverter/generator 24 generally includes a DC input segment 58 connected to the fuel cell 10, a control 60, and an AC or DC output 62, as desired. In a preferred embodiment, a DC motor is driven by the fuel cell input energy 22, and, in turn, drives either a DC or AC generator 66.

While a preferred embodiment of the invention has been shown and described, those skilled in the art will really recognize alterations, modifications, and variations that might be made to the embodiment without departing from the inventive concept. Therefore, the description and claims should be interpreted liberally to protect the preferred embodiment and its full range of equivalents. The claims should be limited only as is necessary in view of the pertinent prior art.

I claim:

1. An energy efficient method for making both sodium hydroxide and hydrochloric acid, comprising the steps of:
   (a) making sodium hydroxide in an electrolytic reactor with a conventional electrolytic process while producing by-product chlorine and hydrogen;
   (b) capturing the by-product chlorine and hydrogen from step (a);
   (c) introducing substantially equimolar amounts of chlorine and hydrogen with water to a hydrogen-chlorine fuel cell to create a hydrochloric acid solution and electricity;
   (d) using the electricity created in the fuel cell to drive the electrolytic reactor to make additional sodium hydroxide; and
   (e) repeating the process steps to generate HCl and NaOH while reducing the overall energy consumption.

2. The method of claim 1 further comprising the step of controlling the feed of water to the fuel cell to control the concentration of the HCl solution produced in the fuel cell.

3. The method of claim 2 wherein the ratio of water:hydrogen is controlled within the range of 8:1 to 20:1 so that the HCl has a concentration between about 17–43 wt. percent.

4. The method of claim 1 further comprising the step of scrubbing the $H_2$ and $Cl_2$ produced in the electrolytic reactor prior to introducing each to the fuel cell;

5. The method of claim 1 wherein the net energy savings is about 33%.

6. The method of claim 1 further comprising the step of reacting the hydrogen and chlorine in the presence of a solid electrolyte to drive the hydrogen-chlorine reaction in the fuel cell to produce electricity.

7. A method for the controlled production of hydrochloric acid solution with the production of useful by-product electricity, comprising the steps of:
   (a) reacting hydrogen and chlorine in a fuel cell in the presence of a water matrix to create hydrochloric acid and electricity; and
   (b) controlling the feed of water to the fuel cell within the range of about 8 moles water to 1 mole hydrogen to about 20 moles water to 1 mole hydrogen so that the electrical output of the fuel cell is relatively constant while the concentration of the HCl is controllable between about 17–43 wt. percent.

8. A system for efficiently producting sodium hydroxide and hydrogen chloride, comprising:
   (a) at least one hydrogen-chlorine fuel cell for combining hydrogen and chlorine gas while capturing a substantial portion of the chemical potential energy generated by the reaction as useful electrical energy;
   (b) a converter for converting the electrical energy captured in the fuel cell into useful power for driving an electrolysis reactor to produce NaOH;
   (c) an electrolysis reactor for electrolytically converting NaCl and $H_2O$ to NaOH, hydrogen, and chlorine;
   (d) means for electrically connecting the fuel cell to the electrolysis reactor to supply electrical energy to the reactor through the converter;
   (e) a hydrogen scrubbers for scrubbing hydrogen generated in the electrolysis reactor, the hydrogen scrubber linking the fuel cell and electrolysis reactor;
   (f) a chlorine scrubber for scrubbing chlorine generated in the electrolysis reactor, the chlorine scrubber also linking the fuel cell and electrolysis reactor;
   (g) means for supplying cooling water to the fuel cell;
   (h) a hydrogen make-up supply line for feeding supplemental or start-up hydrogen to the fuel cell;.
   (i) a chlorine make-up supply line for feeding supplemental or start-up chlorine to the fuel cells;
   (j) means for supplying NaCl and water to the electrolysis reactor;
   (k) a hydrogen purge between the hydrogen scrubber and fuel cell for controlling the purity of hydrogen in the system; and
   (l) a chlorine purge between the chlorine scrubber and fuel cell for controlling the purity of chlorine in the system.

9. The system of claim 8 wherein the fuel cell, the electrolysis reactor, and converter are all mounted on a single skid.

10. The method of claim 6 further comprising using a water matrix with the solid electrolyte.

11. The method of claim 1 further comprising the step of absorbing the hydrochloric acid in catholyte water within the fuel cell.

12. The method of claim 1 wherein the electricity created in the fuel cell is DC current, and the method further comprises the step of inverting to DC current to AC current.

13. The method for claim 11 further comprising the step of cooling the fuel cell with additional cooling water.

14. The method of claim 13 further comprising cooling the cooling water in a heat exchanger system and recycling the cooling water.

* * * * *